% Patented Oct. 24, 1944

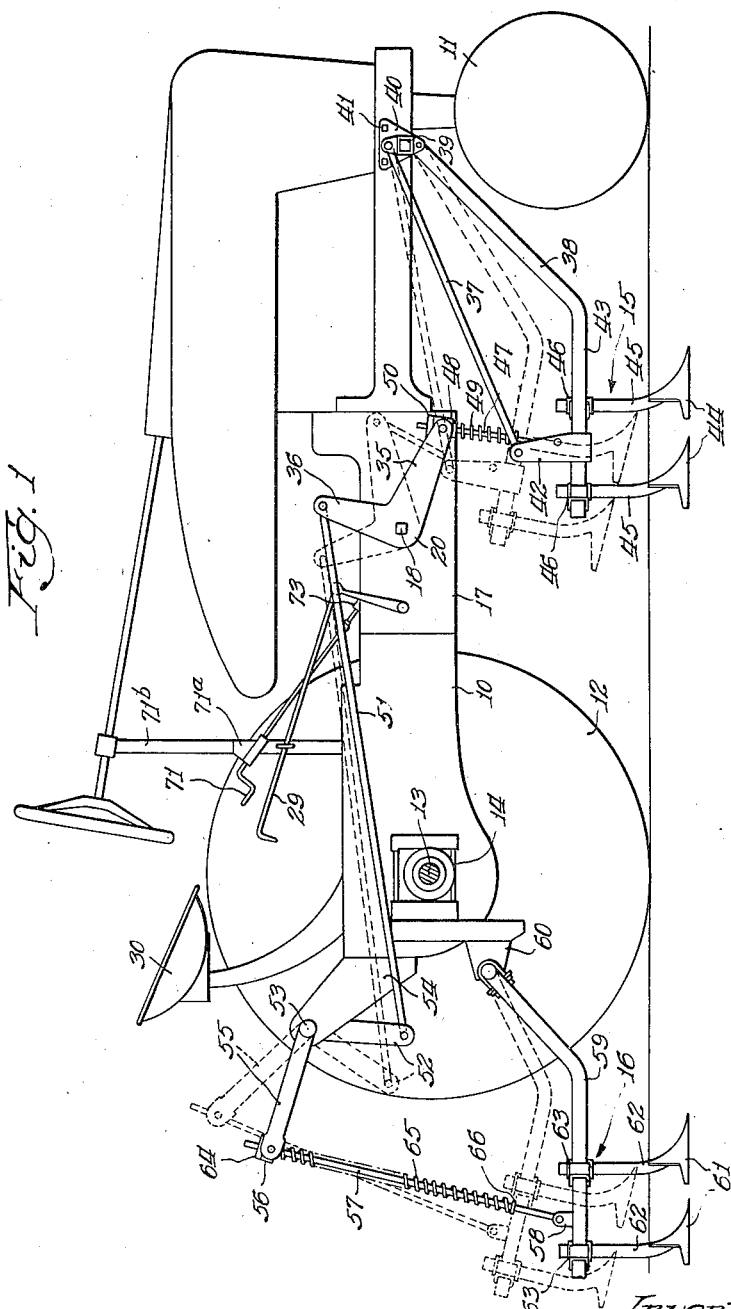

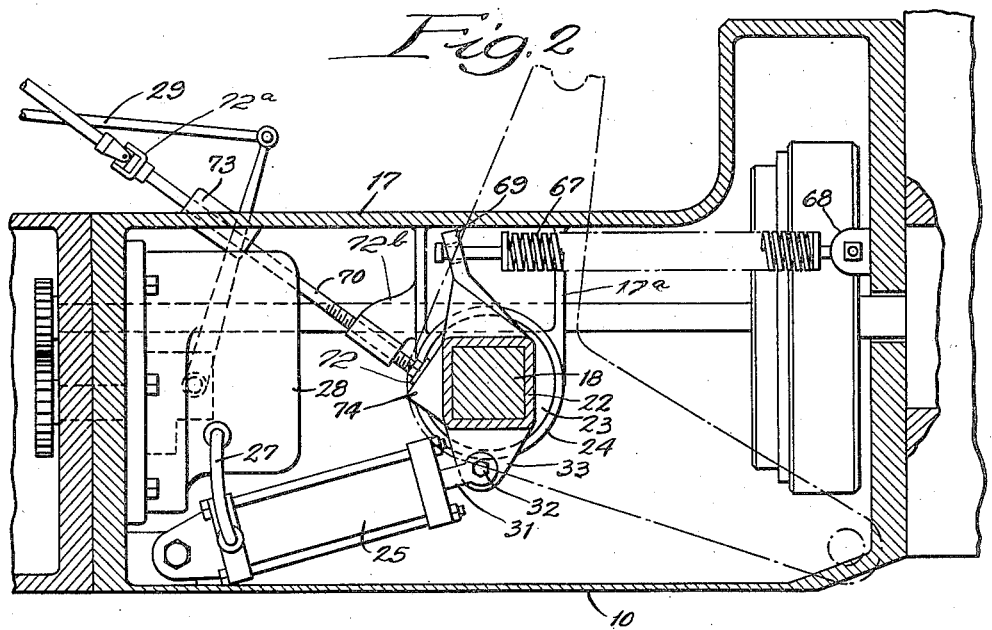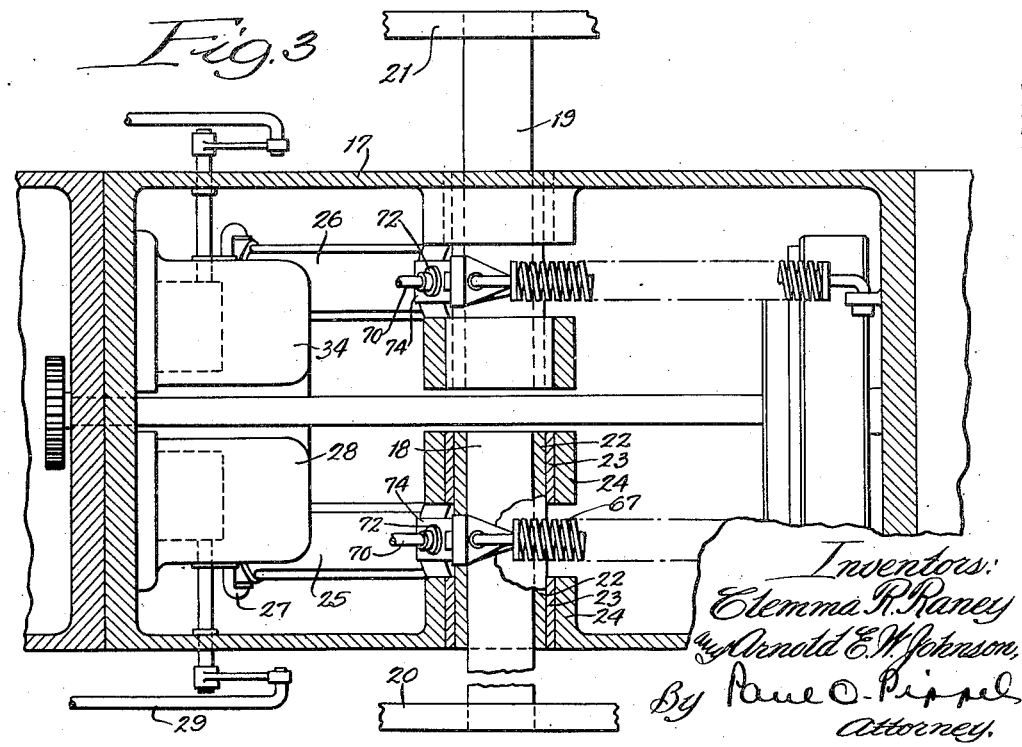

UNITED STATES PATENT OFFICE 2,361,122

POWER LIFT

Clemma R. Raney, Riverside, and Arnold E. W. Johnson, Oak Park, Ill., assignors to International Harvester Company, a corporation of New Jersey Application July 19, 1943, Serial No. 495,268

6 Claims. (Cl. 97—50)

This invention relates to agricultural implements and more particularly to power-lift mechanism therefor.

Power-lift mechanisms for moving agricultural implements to and from ground-working position are well known. It is likewise known to raise and lower tractor-mounted implements through the intermediary of a rock-shaft mounted on the tractor. Where such mechanism is employed, however, it is customary to utilize auxiliary lifting apparatus on the implement itself by which the operating depth of the working tool may be adjusted with respect to the ground. Such auxiliary mechanism adds to the weight of the implement and obscures the vision of the tractor operator.

The present invention has for an object the provision of a simplified power lift for a tractor-mounted implement.

Another and more specific object of the invention is the provision of a simplified depth-adjusting mechanism which is not a part of the tool rig.

A further object is the provision of an adjusting mechanism which is enclosed in the body of the tractor and thus offers no obstacle to the operator's vision of the working area.

These and other objects will become clear from the following detailed description when read in conjunction with the accompanying drawings, wherein:

Figure 1 is a view in side elevation of a tractor, with one rear wheel removed, having an implement attached thereto embodying the features of the present invention;

Figure 2 is an elevational detail, partly in section, of a portion of the lifting mechanism; and Figure 3 is a plan view, partly in section, of the mechanism shown in Figure 2.

Referring particularly to Figure 1, it will be noted that the numeral 10 designates the longitudinally extending body portion of a tractor having front wheels 11 and rear wheels 12. Rear wheels 12 are mounted upon a rear axle 13 journaled in a transverse rear axle structure 14. The implement chosen for purposes of illustration is a field cultivator including a front-mounted cultivator rig 15 and a rear rig 16. While both sides of the tractor are similarly equipped, for convenience only the rigs on the right side of the tractor and the lifting mechanism therefor will be described in detail.

Enclosed in a housing 17 (see Figures 2 and 3) in the body portion 10 of the tractor forwardly of the rear axle structure are transverse rock-shafts 18 and 19 of substantially square cross-section, the ends of which project laterally from the housing 17 on right and left sides thereof, respectively, and are provided at their ends with bell-cranks 20 and 21. Shaft 18 is provided with a sleeve 22 of square cross-section surrounded by spaced bushings 23 journaled in bearings 24 affixed to the housing 17 by a casting 17ª. Also enclosed in the housing 17 are fluid cylinder devices 25 and 26. Cylinder device 25 is supplied with fluid through a pipe 27 from a suitable pump 28, and the supply is regulated by manipulation of the hand lever 29 under the control of the tractor operator and accessible to his station 30. When it is desired to extend the cylinder device 25, fluid is forced from the pump 28 through the pipe 27 to the rear end of the cylinder, forcing a piston 31 outwardly. The piston 31 is connected at 32 to an arm 33 affixed to the sleeve 22 in the space provided between the spaced bushings 23 and bearings 24, and movement of the piston causes the shaft 18 to rock. A similar cylinder 26 is supplied with fluid from a pump 34 to the rock-shaft 19.

As may be clearly seen in Figure 1, the bell-crank 20 is provided with arms 35 and 36 for the connection thereto of the cultivator rigs 15 and 16. The front rig 15 comprises rearwardly and downwardly extending, vertically spaced links 37 and 38 pivotally mounted for vertical movement upon a transverse tool bar 39 affixed by a plate 40 and bolts 41 to the body portion of the tractor. The rear end of the link 37 is pivoted upon the upper end of a bracket 42, the lower end of which is mounted upon a horizontal portion 43 of the lower link 38. Cultivator shovels 44 are mounted on standards 45 attached by brackets 46 to the portion 43. The arm 35 of the bell-crank 20 is connected by a rod 47 to the bracket 42. The rod 47 passes slidingly through a trunnion 48 at the end of the arm 35 and is surrounded by a compression spring 49, the lower end of which abuts against the connection of the rod 47 to the bracket 42 and the other end of which abuts the trunnion 48. A collar 50 is keyed to the upper end of the rod 47 to permit lifting of the cultivator rig by the arm 35.

The arm 36 of the bell-crank 20 is connected by a rearwardly extending link 51 to a lever 52 affixed to a shaft 53 rockably mounted in a bracket 54 affixed to the body of the tractor. A rearwardly extending arm 55 is affixed to the shaft 53 and is bifurcated at its end to receive a trunnion 56. A rod 57 is passed through an opening in the trunnion 56 and is connected at its lower end to a lug 58 on the rearwardly extending portion of a tool beam 59, the forward end of which is bent laterally and pivoted in a bracket 60 affixed to the rear axle structure of the tractor. Cultivator shovels 61 are mounted on standards 62 attached by brackets 63 to the beam 59. To provide lifting force between the rod 57 and the rig 16, a collar 64 is keyed to the upper end of the rod. The working tools are urged downwardly and held flexibly in working position by a compression spring 65, the upper end of which abuts against the trunnion 56 and the lower end against a collar 66 keyed to the rod 57.

Referring particularly to Figures 2 and 3, it will be noted that extension of the piston 31 causes the bell-crank 20 to rock in a counter-clockwise direction to raise the working tools to the transport position indicated in dotted lines in Figure 1. Retraction of the piston 31 and return of the working tools to ground-working position are assisted by the weight of the working tools and the biasing action of a spring 67 connected at one end to a lug 68 on the housing 17 and at its other end to an arm 69 affixed to the sleeve 22.

The depth at which it is desired that the cultivator shovels 44 and 61 work the ground has previously been adjusted by hand levers, and the like, located outside of the tractor, and frequently on the implement itself, thus increasing the weight of the implement and often obscuring the operator's vision of the area being worked. According to the present invention, the above mentioned disadvantages are avoided and the working depth of the implement adjusted by a simple and efficient mechanism enclosed in the body of the tractor and having no elements that tend to obscure the working area. This mechanism comprises an elongated crank member 70 having a handle 71 and an enlarged end portion 72. The member 70 extends forwardly and downwardly, and its upper end is slidingly supported in an opening in a bracket 71ª fast on the steering post 71ᵇ of the tractor. The member preferably comprises two sections connected by a universal joint 72ª. The lower section of the member 70 is slidingly received in a sleeve 73 secured to the upper wall of the housing 17, and its end extending into housing 17 is threaded for engagement with a threaded opening in bracket 72ᵇ affixed to the casting 17ª. As viewed in Figure 2, the member 70 extends forwardly and downwardly into the housing 17, and the enlarged portion 72 is in contact with an abutment 74 affixed to the sleeve 22. Thus, it is clear that the contact of the member 70 with the abutment 74 limits the clockwise movement of the shaft 18 and, therefore, of the bell-crank 20, and it is likewise clear that the limit can be varied by turning handle 71 to shorten or increase the effective length of the member 70.

In operation, when it is desired to raise the cultivator rigs to transport position, lever 29 is manipulated to initiate operation of the pump 28 and force fluid through the pipe 27 into the cylinder 25. The piston 31, forced outwardly by the fluid and acting through the arm 33, causes the shaft 18 and bell-crank 20 to rotate in an anti-clockwise direction to the position indicated in dotted lines in Figure 1. An arm 35 of the bell-crank, in its movement, carries with it the front cultivator rig 15, while arm 36, acting through link 51, lever 52, and arm 55, raises rear rig 16 about its pivotal connection with the bracket 60. Upon release of fluid from the cylinder 25, the weight of the working tools and the action of the spring 67 force fluid back into the pump 28 and cause the working tools to return to a working position which may be predetermined by adjustment of the member 70 with respect to the abutment 74. Once the tool rigs have been brought into working position, the working depth thereof may be further adjusted by manipulation of the rod 70. It should now be clear that a simple, compact, and efficient power-lift mechanism has been provided which offers maximum protection from the elements, ease of operation, and visibility of the working area. It should likewise be clear that while the invention has been described in its application to a tillage implement, it may be utilized with other implements as well.

Having described the invention, it should be understood that variations may be made therein without departing from the spirit of the invention or the scope of the appended claims.

What is claimed is:

1. In a tractor-mounted agricultural implement adapted for vertical movement with respect to the tractor, and power-lifting means mounted upon the tractor, in combination, a transverse rock-shaft on the tractor having a portion thereof enclosed within the body of the tractor and a portion projecting laterally therefrom, a radial extension on the enclosed portion of said shaft means connecting said shaft to said implement for movement thereof, means connecting said power means to said rock-shaft for rocking movement thereof, and adjustable stop means partly enclosed in the body portion of the tractor arranged to contact the extension on the enclosed portion of said rock-shaft to limit the rotational movement thereof.

2. In a tractor-mounted agricultural implement adapted for vertical movement with respect to the tractor, and power-lifting means mounted upon the tractor, in combination, a transverse rock-shaft on the tractor having a portion thereof enclosed within the body of the tractor and a portion projecting laterally therefrom, an arm on the enclosed portion of said shaft means connecting said shaft to said implement for movement thereof, means connecting said power means to said rock-shaft for rocking movement thereof, and spring means connected to the arm on the portion of said shaft enclosed within the body of the tractor arranged to urge said shaft to rotational movement in one direction.

3. In a tractor-mounted agricultural implement including front and rear earth-working tool rigs mounted upon opposite sides of the tractor for vertical movement with respect thereto, and power-lifting means mounted upon the tractor, in combination, a transverse rock-shaft on the tractor having a portion thereof enclosed within the body of the tractor and a portion projecting laterally therefrom, arms affixed to and extending radially from said laterally projecting portion, means connecting said arms to said tool rigs for movement thereof, means enclosed within the body of the tractor for biasing said rock-shaft to rotation in one direction, means connecting said power means to said rock-shaft for rocking movement thereof, and adjustable stop means partly enclosed in the body of the tractor arranged to contact the enclosed portion of said rock-shaft to limit the rotational movement thereof.

4. In a tractor-mounted agricultural implement including earth-working tools mounted for movement to and from ground-working position, in combination, a transverse rock-shaft on the tractor having a portion thereof enclosed within the body of the tractor and a portion projecting laterally therefrom, a bell-crank on the laterally projecting end of said shaft, means connecting said bell-crank to the said earth-working tools for movement thereof, means connecting the tractor body and said shaft for biasing said tools to ground-working position, power means connected to the portion of said rock-shaft within the tractor body arranged to rock said rock-shaft, and adjustable stop means arranged to contact that portion of the rock-shaft within said tractor body to limit the extent of rotational movement of said shaft in one direction.

5. In a tractor-mounted agricultural implement including earth-working tools mounted for movement to and from ground-working position, in combination, a transverse rock-shaft on the tractor having a portion thereof enclosed within the body of the tractor and a portion projecting laterally therefrom, an arm on the portion of the shaft within the tractor body, a bell-crank on the laterally projecting end of said shaft, means connecting said bell-crank to the said earth-working tools for movement thereof, means within said tractor body connecting the tractor body and the arm on said shaft for biasing said tools to ground-working position, power means connected to the portion of said rock-shaft within the tractor body arranged to rock said rock-shaft, a radial extension on the shaft within said tractor body, stop means arranged to contact said extension to limit the extent of rotational movement of said shaft in one direction, and means beyond the confines of said tractor body for adjusting said stop means to vary the extent of rotational movement of said rock-shaft.

6. In a tractor-mounted agricultural implement including earth-working tool rigs mounted for vertical movement with respect to the tractor, a lifting and adjusting mechanism enclosed within the body of the tractor comprising, in combination, a transverse rock-shaft having a portion thereof enclosed within the body of the tractor and a portion projecting therefrom, means connecting said rock-shaft to said tool rigs, an arm on the enclosed portion of said rock-shaft, power means connected to said arm for rocking movement of said shaft, a second arm on the enclosed portion of said shaft, yieldable means connected to said arm arranged to bias said shaft to rocking movement in one direction, an abutment on the enclosed portion of said shaft, stop means arranged to engage said abutment to limit the rotational movement of said shaft in one direction, and means beyond the confines of said tractor body for adjusting said stop means to vary the extent of rotational movement of said rock-shaft.

CLEMMA R. RANEY.
ARNOLD E. W. JOHNSON.